United States Patent
Chen

(10) Patent No.: US 10,498,972 B1
(45) Date of Patent: Dec. 3, 2019

(54) HIGH-DYNAMIC-RANGE IMAGING SYSTEM AND METHOD

(71) Applicant: Himax Imaging Limited, Tainan (TW)

(72) Inventor: Po-Chang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 16/146,540

(22) Filed: Sep. 28, 2018

(51) Int. Cl.
*H04N 5/235* (2006.01)
*H04N 5/232* (2006.01)

(52) U.S. Cl.
CPC ......... *H04N 5/2355* (2013.01); *H04N 5/2329* (2013.01)

(58) Field of Classification Search
CPC ....... H04N 5/355–3559; H04N 5/2355; H04N 5/235–243; H04N 5/3745–37455; H04N 5/378; H04N 5/3355; H04N 5/37213; H04N 5/2329; G06T 2207/20208; G06T 5/007–009; G03B 7/00–28; G03B 2207/00–005; H03M 1/00–645
USPC ............. 348/302, 322, 362–368, 222, 221.1, 348/229.1; 341/155–172
See application file for complete search history.

(56) References Cited

U.S. PATENT DOCUMENTS

| 2009/0251556 | A1* | 10/2009 | Mabuchi | H01L 27/14621 348/222.1 |
| 2014/0284449 | A1* | 9/2014 | Uchida | H04N 5/2254 250/201.2 |
| 2015/0092096 | A1* | 4/2015 | Mabuchi | H01L 27/14621 348/302 |

OTHER PUBLICATIONS

Bo Zhao et al., "A 64 × 64 CMOS Image Sensor With On-Chip Moving Object Detection and Localization," IEEE Transactions on Circuits and Systems for Video Technology, 22(4), 581-588, 2012.
Dongsoo Kim et al., "Tri-Mode Smart Vision Sensor With 11-Transistors/Pixel for Wireless Sensor Networks," IEEE Sensors Journal, vol. 13, No. 6, Jun. 2013.

* cited by examiner

*Primary Examiner* — Xi Wang
(74) *Attorney, Agent, or Firm* — Donald E. Stout; Stout, Uxa & Buyan, LLP

(57) ABSTRACT

A high-dynamic-range (HDR) imaging system includes a pixel array providing a high-sensitivity signal and a low-sensitivity signal; and an HDR encoder generating an encoded signal according to the high-sensitivity signal and the low-sensitivity signal. A flag bit is asserted when the high-sensitivity signal is not greater than a predetermined threshold, otherwise the flag bit is de-asserted.

5 Claims, 6 Drawing Sheets

HIGH-DYNAMIC-RANGE IMAGING SYSTEM AND METHOD

BACKGROUND OF THE INVENTION

1. Field of the Invention

The present invention generally relates to imaging system and method, and more particularly to a high-dynamic-range (HDR) imaging system and method for global or rolling shutter.

2. Description of Related Art

A complementary metal-oxide-semiconductor (CMOS) image sensor has been widely applied to mobile applications. The CMOS image sensor may be applied to other applications such as automotive and security applications. Requirements for the automotive and security applications are quite different from that for the mobile applications. For example, one strong request is high dynamic range (HDR), with which ultra dim and bright scenes can be captured at the same frame and with good quality.

Dynamic range of pixel can be extended by splitting a single pixel into two photodiodes, one small and one large. Nevertheless, unwanted motion artifacts are present as the integration time of the long exposure and short exposure do not overlap. Motion artifacts may be generated due to substantially different exposure time of long-exposure pixels and short-exposure pixels. The long-exposure pixels may incur motion blur, which results in dragging phenomenon at an object edge.

Some high-dynamic-range (HDR) imaging systems have been proposed by either using spatially-arranged pixel array or temporal multi-exposure frames. However, the conventional HDR imaging systems are either high analog-to-digital conversion cycles or high HDR pixel data bit.

For the foregoing reasons, a need has arisen to propose a novel HDR image scheme in order to overcome drawbacks of the conventional HDR imaging systems.

SUMMARY OF THE INVENTION

In view of the foregoing, it is an object of the embodiment of the present invention to provide a high-dynamic-range (HDR) imaging system and method with enhanced dynamic range for substantially reducing amount of data being generated and transmitted and/or reducing analog-to-digital conversion cycles.

According to one embodiment, a high-dynamic-range (HDR) imaging system includes a pixel array and an HDR encoder. The pixel array provides a high-sensitivity signal and a low-sensitivity signal. The HDR encoder generates an encoded signal according to the high-sensitivity signal and the low-sensitivity signal. A flag bit is asserted when the high-sensitivity signal is not greater than a predetermined threshold, otherwise the flag bit is de-asserted.

DETAILED DESCRIPTION OF THE INVENTION

Figure 1A:
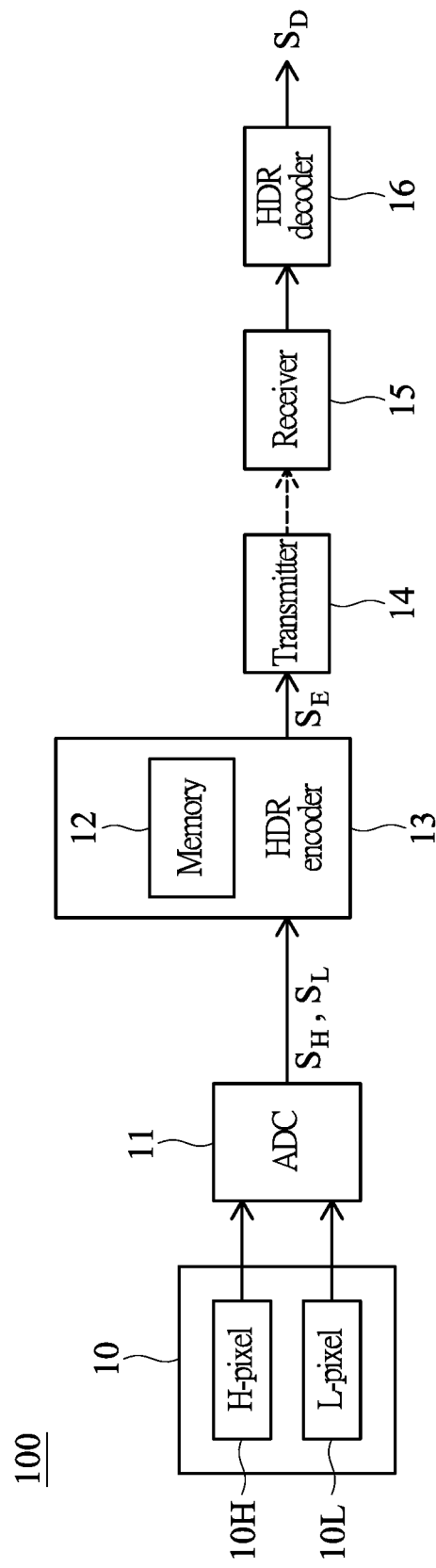
FIG. 1A shows a block diagram illustrating a high-dynamic-range (HDR) imaging system according to a first embodiment of the present invention.
Figure 1B:
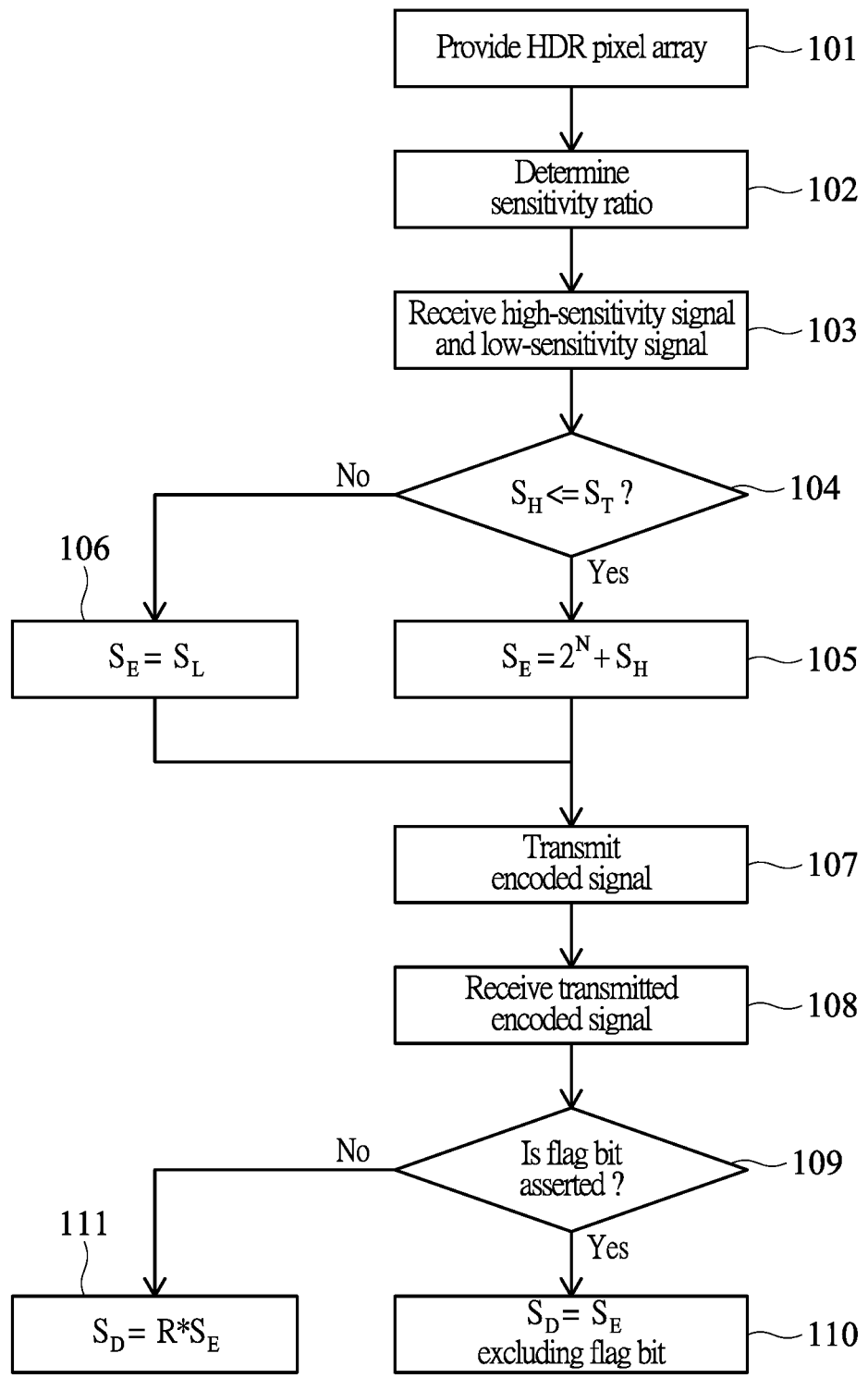
FIG. 1B shows a flow diagram illustrating a high-dynamic-range (HDR) imaging method according to one embodiment of the present invention.

FIG. 1A shows a block diagram illustrating a high-dynamic-range (HDR) imaging system 100 according to a first embodiment of the present invention, and FIG. 1B shows a flow diagram illustrating a high-dynamic-range (HDR) imaging method according to one embodiment of the present invention. The HDR imaging system 100 and method may be preferably, but not necessarily, adaptable to machine vision cameras.

Figure 2A:
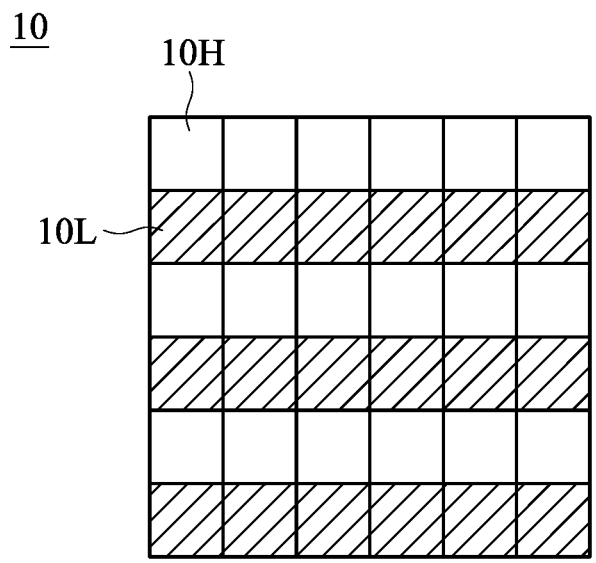
FIG. 2A schematically shows an exemplary pixel array of FIG. 1A.
Figure 2B:
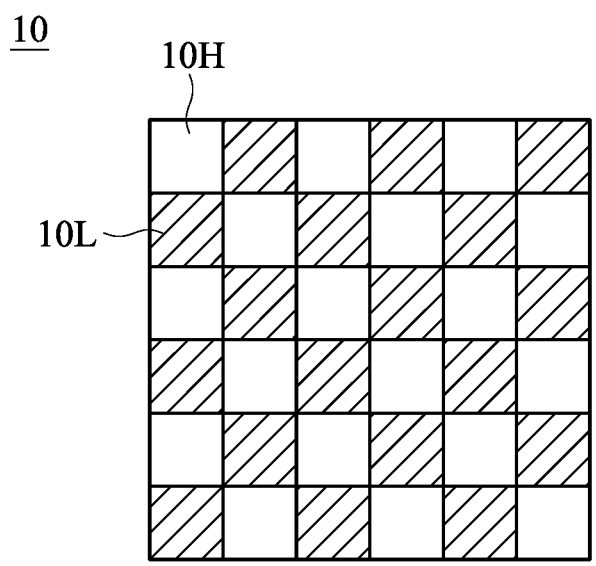
FIG. 2B schematically shows another exemplary pixel array of FIG. 1A.

In the embodiment, the HDR imaging system 100 may include a pixel array 10 (step 101) that may be composed of a plurality of high-sensitivity pixels (or H-pixels) 10H and a plurality of low-sensitivity pixels (or L-pixels) 10L, where the high-sensitivity pixels 10H have higher sensitivity than the low-sensitivity pixels 10L. FIG. 2A schematically shows an exemplary pixel array 10 of FIG. 1A, where the high-sensitivity pixels 10H are spatially disposed at odd-numbered rows, and the low-sensitivity pixels 10L are disposed at even-numbered rows. FIG. 2B schematically shows another exemplary pixel array 10 of FIG. 1A, where the high-sensitivity pixels 10H and the low-sensitivity pixels 10L are spatially arranged in an alternative manner.

Figure 2C:
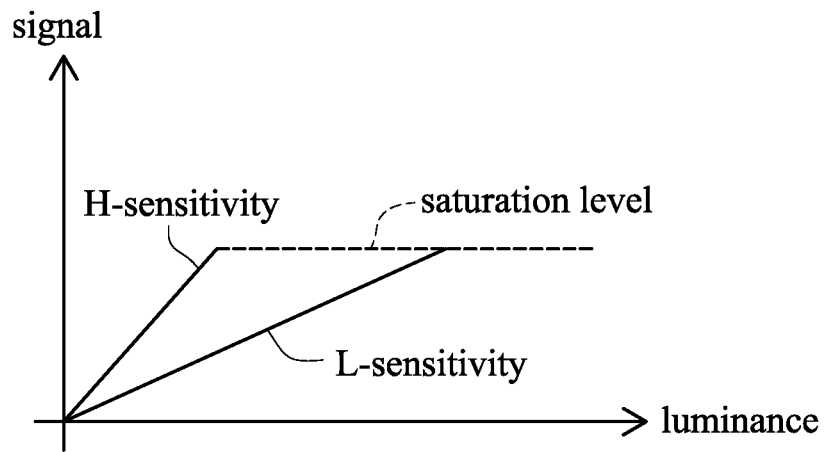
FIG. 2C shows exemplary curves illustrating a high-sensitivity signal generated by the high-sensitivity pixel and a low-sensitivity signal generated by the low-sensitivity pixel with respect to incident luminance, respectively.

FIG. 2C shows exemplary curves illustrating a high-sensitivity signal generated by the high-sensitivity pixel 10H and a low-sensitivity signal generated by the low-sensitivity pixel 10L with respect to incident luminance, respectively. It is observed that the high-sensitivity pixels 10H are more sensitive to light than the low-sensitivity pixels 10L, but become saturated (e.g., at a saturation level as exemplified in FIG. 2C) before the low-sensitivity pixels 10L. In this specification, the term signal may represent either an analog electrical signal or a digital data signal (the analog electrical signal in this case), and could be readily understood from context.

Instead of the spatial arrangement as set forth above, the high-sensitivity signal and the low-sensitivity signal may be generated by another mechanism such as long/short exposure time, high/low gain, or large/small product of exposure time and gain. In another embodiment, the high-sensitivity signal and the low-sensitivity signal may be generated in a temporal arrangement. For example, the high-sensitivity signal is generated from a current frame, and the low-sensitivity signal is generated in a succeeding frame with a shorter exposure time (or lower gain or smaller product of exposure time and gain) than the current frame. The generated high-sensitivity signal, if in analog form, may be stored in a capacitor. Alternatively, the generated high-sensitivity signal, if in digital form, may be stored in a memory device. Details of the temporal arrangement may be referred to "A 64×64 CMOS Image Sensor With On-Chip Moving Object Detection and Localization," entitled to Bo Zhao et al., in IEEE Transactions on Circuits and Systems for Video Technology, vol. 22, issue 4, April 2012, and "Tri-Mode Smart Vision Sensor With 11-Transistors/Pixel for Wireless Sensor Networks," entitled to Dongsoo Kim et al., in IEEE Sensors Journal, vol. 13, issue 6, June 2013, the disclosures of which are incorporated herein by reference.

The high-sensitivity signal and the low-sensitivity signal may be obtained by adopting an appropriate exposure mechanism, for example, global shutter or rolling shutter. In global shutter mechanism, a first frame is captured by a pixel array with a first exposure time and gain. After reading out the first frame, a second frame is captured by the same pixel array with a second exposure time and gain, product of which is greater than the product of the first exposure time and gain. An HDR image can be obtained (or fused) by performing composition on the first frame and the second frame. In rolling shutter mechanism, a frame is captured not by taking the exposure of the entire array at a time, but by scanning line-by-line either vertically or horizontally. Details of exposure mechanisms mentioned above are disclosed in "A comparison of high dynamic range CIS technologies for automotive applications," entitled to Johannes Solhusvik et al., 2013, and disclosed in "A 1280×1080 4. 2 µm Split-diode Pixel HDR Sensor in 110 nm BSI CMOS Process," entitled to Trygve Willassen et al., 2015, the disclosures of which are incorporated herein by reference.

In step 102, a sensitivity ratio between the high-sensitivity pixels 10H and the low-sensitivity pixels 10L is determined. In the embodiment, the sensitivity ratio has a fixed value within an HDR image frame. The HDR imaging system 100 of the embodiment may include an analog-to-digital converter (ADC) 11 configured to convert a signal (generated from the pixel array 10) from an analog form into an equivalent digital form. Specifically, the ADC 11 may convert the (analog) high-sensitivity signal (from the high-sensitivity pixel 10H) into (digital) high-sensitivity signal $S_H$ and convert the analog) low-sensitivity signal (from the low-sensitivity pixel 10L) into (digital) low-sensitivity signal $S_L$.

The HDR imaging system 100 of the embodiment may include a memory 12, such as dynamic random-access memory (DRAM) or static random-access memory (SRAM), that is used to temporarily store at least one of the high-sensitivity signal $S_H$ and the low-sensitivity signal $S_L$. According to one aspect of the embodiment, the HDR imaging system 100 may include an HDR encoder 13 (with the memory 12 disposed therein) that is operatively coupled to receive, from the ADC 11 and the memory 12, the high-sensitivity signal $S_H$ and the low-sensitivity signal $S_L$ (step 103), according to which an encoded signal $S_E$ may be generated. Specifically, in step 104, the high-sensitivity signal $S_H$ is compared with a predetermined threshold $S_T$. In the embodiment, the predetermined threshold $S_T$ may be equal to the saturation level, or be less than but substantially near the saturation level of the high-sensitivity signal. If the high-sensitivity signal $S_H$ is not greater than the predetermined threshold $S_T$ (i.e., $S_H \leq S_T$), a flag bit is asserted (e.g., a value "1"), which is then concatenated with the high-sensitivity signal $S_H$ to generate the encoded signal $S_E$ (step 105). For example, the asserted flag bit (with a value "1") is concatenated as a most significant bit (MSB). If the high-sensitivity signal $S_H$ is an N-bit signal, the encoded signal $S_E$ is thus an (N+1)-bit signal with the MSB of "1" (i.e., $S_E=2^N+S_H$). On the contrary, if the high-sensitivity signal $S_H$ is greater than the predetermined threshold $S_T$ (i.e., $S_H>S_T$), the flag bit is de-asserted (e.g., a value "0"), which is then concatenated with the low-sensitivity signal $S_L$ to generate the encoded signal $S_E$, for example, an (N+1)-bit signal with the MSB of "0" (i.e., $S_E=S_L$) (step 106).

The HDR imaging system 100 of the embodiment may include a transmitter 14 that is operatively coupled to receive and then transmit the encoded signal $S_E$ (step 107). On the other hand, the HDR imaging system 100 may include a receiver 15 that is operatively coupled to receive the transmitted encoded signal $S_E$ (step 108). The transmitter 14 and the receiver 15 of the embodiment may be operated either in a wired manner or wirelessly.

In the embodiment, the HDR imaging system 100 may include an HDR decoder 16 that is operatively coupled to receive the received encoded signal $S_E$ and accordingly generates a decoded signal $S_D$. Specifically, in step 109, it is determined whether the flag bit (e.g., MSB) of the received encoded signal $S_E$ is asserted (e.g., "1"). If the flag bit is asserted (e.g., "1"), the decoded signal $S_D$ is generated by excluding the flag bit from the received encoded signal $S_E$ (step 110). On the contrary, if the flag bit is de-asserted (e.g., "0"), the decoded signal $S_D$ is generated by multiplying the received encoded signal $S_E$ by the sensitivity ratio R (determined in step 102), that is, $S_D=R*S_E$ (step 111).

Figure 2D:
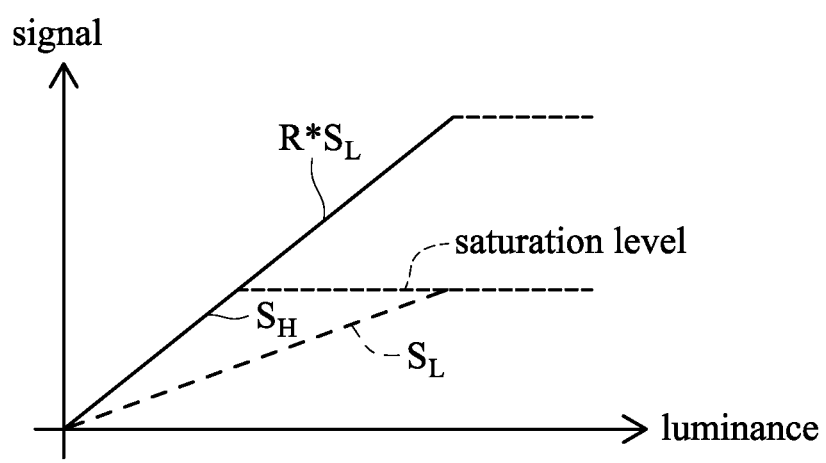
FIG. 2D shows exemplary curves illustrating the high-sensitivity signal and the low-sensitivity signal with the enhanced dynamic range.

According to the embodiment proposed above, the dynamic range of the pixel array 10 can be substantially enhanced as shown in FIG. 2D. More importantly, only one extra (flag) bit is generated and transmitted in the embodiment. To the contrary, for an imaging system without adopting the HDR encoder 13 of the embodiment, multiple extra bits are generated and transmitted. For example, when the high-sensitivity signal and the low-sensitivity signal are both 10-bit digital data and the HDR ratio is 16, the output signal would need 14 bits. The higher HDR ratio is, more bits and more power consumption are required.

Figure 3:
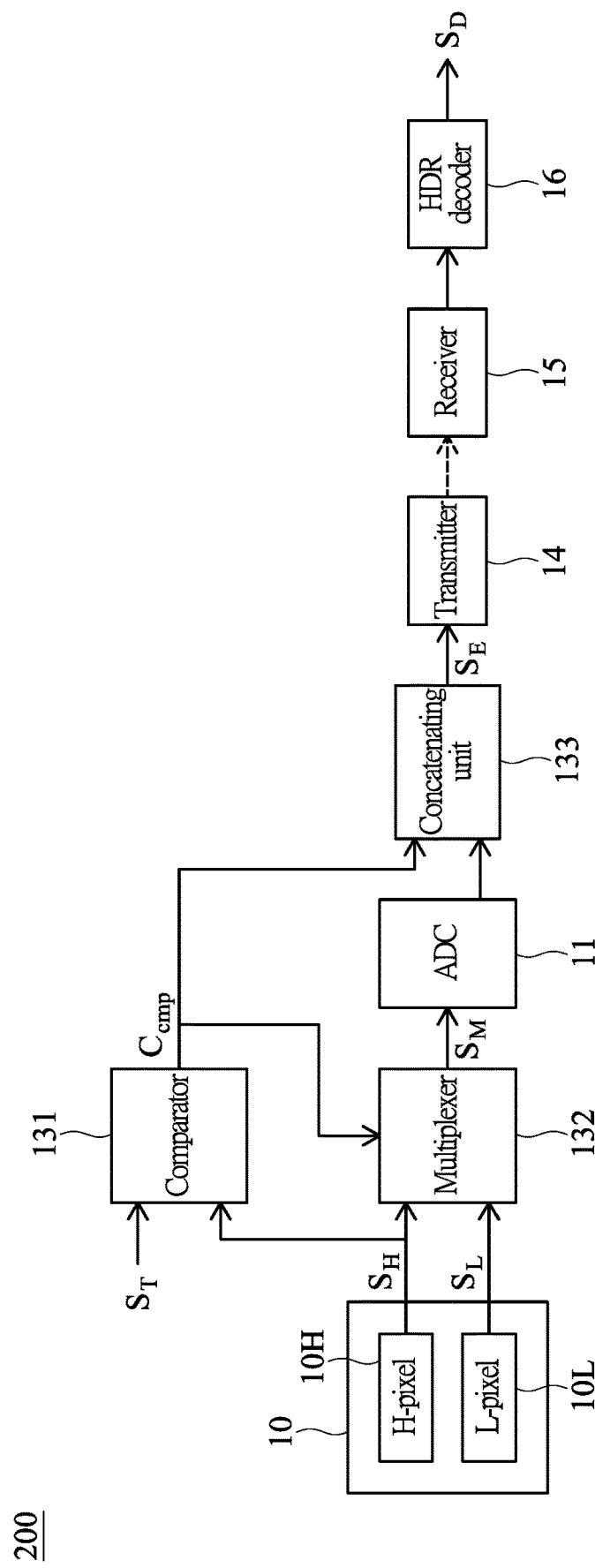
FIG. 3 shows a block diagram illustrating a high-dynamic-range (HDR) imaging system according to a second embodiment of the present invention.

FIG. 3 shows a block diagram illustrating a high-dynamic-range (HDR) imaging system 200 according to a second embodiment of the present invention. Blocks of FIG. 3 being similar to the first embodiment (FIG. 1A) are denoted with the same numerals and details thereof are omitted for brevity, and the flow diagram shown in FIG. 1B may be still referred to.

Similar to the HDR encoder 13 of FIG. 1A, the HDR imaging system 200 of the present embodiment may include a comparator 131 configured to receive and compare the high-sensitivity signal $S_H$ (generated from the high-sensitivity pixel 10H) with the predetermined threshold $S_T$ (step 104). If the high-sensitivity signal $S_H$ is not greater than the predetermined threshold $S_T$ (i.e., $S_H \leq S_T$), the comparator 131 generates an asserted flag bit $C_{cmp}$ (e.g., "1"), otherwise the comparator 131 generates a de-asserted flag bit $C_{cmp}$ (e.g., "0").

The HDR imaging system 200 of the embodiment may include a multiplexer 132 configured to select one of the high-sensitivity signal $S_H$ and the low-sensitivity signal $S_L$ as a multiplexed signal $S_M$ according to the flag bit $C_{cmp}$. Specifically, if the flag bit $C_{cmp}$ is asserted, the multiplexed signal $S_M$ is the high-sensitivity signal $S_H$, otherwise the multiplexed signal $S_M$ is the low-sensitivity signal $S_L$.

The HDR imaging system 200 of the embodiment may include an analog-to-digital converter (ADC) 11 configured to convert the multiplexed signal $S_M$ from an analog form into an equivalent digital form, thereby generating a digital multiplexed signal $S_M$.

In the embodiment, the HDR imaging system 200 of the embodiment may include a concatenating unit 133 that is operatively coupled to receive the digital multiplexed signal $S_M$ and accordingly generates an encoded signal $S_E$ according to the flag bit $C_{cmp}$. Specifically, if the flag bit $C_{cmp}$ is asserted, the encoded signal $S_E$ is generated by concatenating the asserted flag bit (e.g., most significant bit or MSB with a value "1") with the multiplexed signal $S_M$, that is, the high-sensitivity signal $S_H$ (step 105). For example, if the high-sensitivity signal $S_H$ is an N-bit signal, the encoded signal $S_E$ is an (N+1)-bit signal with the MSB of "1" (i.e., $S_E=2^N+S_H$). On the contrary, if the flag bit $C_{cmp}$ is de-asserted, the encoded signal $S_E$ is generated by concatenating a de-asserted flag bit (e.g., most significant bit or MSB with a value "0") with the multiplexed signal $S_M$ (i.e., the low-sensitivity signal $S_L$), that is, $S_E=S_L$ (step 106).

Compared with the first embodiment (FIG. 1A), the encoding performed by the comparator 131 and the multiplexer 132 is primarily carried out before the analog-to-digital conversion (by the ADC 11). Accordingly, analog-to-digital conversion cycles of the present embodiment can be substantially reduced for the reason that only one of the high-sensitivity signal $S_H$ and the low-sensitivity signal $S_L$ is subjected to analog-to-digital conversion. That is, the embodiments of the present invention need at most half the ADC cycles of the preceding embodiment. For an imaging system without adopting the architecture of the present embodiment as shown in FIG. 3, more ADC cycles are required than the present embodiment. Specifically, for a spatially-arranged M×N pixel array, M×N ADC cycles are required instead of M×N/2 ADC cycles as in the present embodiment. For a temporal HDR, such as staggered HDR that exposes (and reads out) the pixel array Z times, M×N×Z ADC cycles are required instead of M×N×Z/2 as in the present embodiment.

Figure 4:
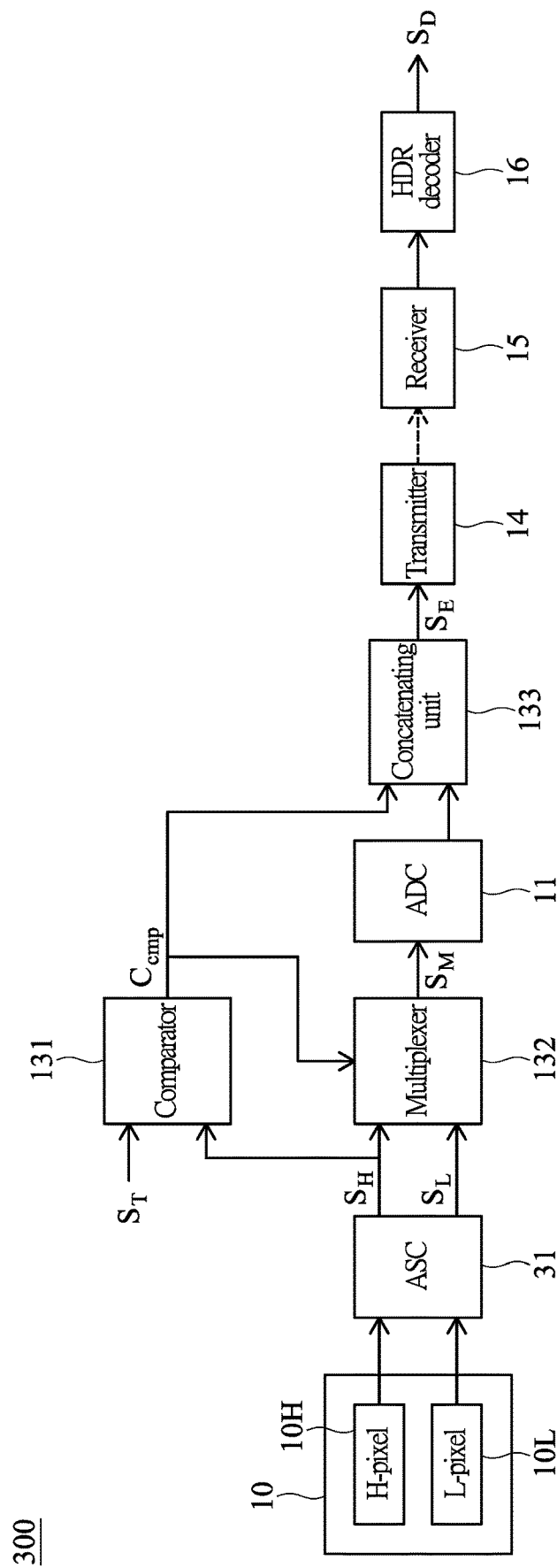
FIG. 4 shows a block diagram illustrating a high-dynamic-range (HDR) imaging system according to a third embodiment of the present invention.

FIG. 4 shows a block diagram illustrating a high-dynamic-range (HDR) imaging system 300 according to a third embodiment of the present invention. Blocks of FIG. 4 being similar to the first embodiment (FIG. 1A) or the second embodiment (FIG. 3) are denoted with the same numerals and details thereof are omitted for brevity, and the flow diagram shown in FIG. 1B may be still referred to.

In the embodiment, the HDR imaging system 300 may include an analog signal conditioner (ASC) 31 that is operatively coupled to receive and condition (e.g., perform current/voltage conversion, correlated double sampling, filtering and/or amplification on) signals collected by high-sensitivity pixels 10H and low-sensitivity pixels 10L, thereby generating the high-sensitivity signal $S_H$ and the low-sensitivity signal $S_L$, respectively.

Similar to the preceding embodiments, only one (flag) bit is generated and transmitted instead of multiple bits as commonly required in the conventional imaging systems. Moreover, the present embodiment need at most half the ADC cycles of the conventional systems.

Although specific embodiments have been illustrated and described, it will be appreciated by those skilled in the art that various modifications may be made without departing from the scope of the present invention, which is intended to be limited solely by the appended claims.

What is claimed is:

1. A high-dynamic-range (HDR) imaging system, comprising:
   a pixel array providing a high-sensitivity signal and a low-sensitivity signal;
   an HDR encoder generating an encoded signal according to the high-sensitivity signal and the low-sensitivity signal;
   an analog-to-digital converter (ADC) disposed between the pixel array and the HDR encoder to convert the high-sensitivity signal and the low-sensitivity signal from an analog form into an equivalent digital form; and
   an HDR decoder that generates a decoded signal according to the encoded signal;
   wherein a flag bit is asserted when the high-sensitivity signal is not greater than a predetermined threshold, otherwise the flag bit is de-asserted;
   wherein the encoded signal is generated by concatenating the asserted flag bit with the high-sensitivity signal in digital form when the high-sensitivity signal in digital form is not greater than the predetermined threshold, otherwise the encoded signal is generated by concatenating the de-asserted flag bit with the low-sensitivity signal in digital form;
   wherein the decoded signal is generated by excluding the flag bit from the encoded signal when the flag bit is asserted, otherwise the decoded signal is generated by multiplying the encoded signal by a sensitivity ratio between high-sensitivity pixel and low-sensitivity pixel.

2. The system of claim 1, wherein the predetermined threshold is equal to or less than a saturation level of the high-sensitivity signal.

3. The system of claim 1, wherein the HDR encoder further comprising:
   a memory that temporarily stores at least one of the high-sensitivity signal and the low-sensitivity signal.

4. A high-dynamic-range (HDR) imaging method, comprising:
   providing a pixel array providing a high-sensitivity signal and a low-sensitivity signal; and
   determining a sensitivity ratio between high-sensitivity pixel and low-sensitivity pixel;
   generating an encoded signal according to the high-sensitivity signal and the low-sensitivity signal;
   converting the high-sensitivity signal and the low-sensitivity signal from an analog form into an equivalent digital form; and
   generating a decoded signal according to the encoded signal;
   wherein a flag bit is asserted when the high-sensitivity signal is not greater than a predetermined threshold, otherwise the flag bit is de-asserted;
   wherein the encoded signal is generated by concatenating the asserted flag bit with the high-sensitivity signal in digital form when the high-sensitivity signal is not greater than the predetermined threshold, otherwise the encoded signal is generated by concatenating the de-asserted flag bit with the low-sensitivity signal in digital form;
   wherein the decoded signal is generated by excluding the flag bit from the encoded signal when the flag bit is asserted, otherwise the decoded signal is generated by multiplying the encoded signal by a sensitivity ratio between the high-sensitivity pixel and the low-sensitivity pixel.

5. The method of claim 4, wherein the predetermined threshold is equal to or less than a saturation level of the high-sensitivity signal.

* * * * *